(12) United States Patent
Donick et al.

(10) Patent No.: US 6,722,720 B2
(45) Date of Patent: Apr. 20, 2004

(54) ENGINE COMPARTMENT SOUND BAFFLE

(75) Inventors: Michael Donick, Canton, MI (US); Mark Whaley, Southfield, MI (US); Pasquale Lalama, Sterling Heights, MI (US); Sara Veyo, Dearborn, MI (US); Steve VonFoerster, Troy, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 10/248,481

(22) Filed: Jan. 22, 2003

(65) Prior Publication Data

US 2003/0146639 A1 Aug. 7, 2003

Related U.S. Application Data

(60) Provisional application No. 60/353,353, filed on Feb. 4, 2002.

(51) Int. Cl.[7] .............................................. B62D 33/00
(52) U.S. Cl. ............................................................ 296/39.3
(58) Field of Search .......................... 293/39.3, 146.7, 293/39.1, 39.2, 214, 189

(56) References Cited

U.S. PATENT DOCUMENTS

| | | | | |
|---|---|---|---|---|
| 1,803,668 A | * | 5/1931 | Gale ........................... 296/39.3 |
| 1,845,444 A | * | 2/1932 | Sawyer ......................... 442/36 |
| 2,116,771 A | * | 5/1938 | Seaman ......................... 428/153 |
| 4,083,595 A | * | 4/1978 | Maier ........................... 296/39.3 |
| 4,270,328 A | * | 6/1981 | Page et al. ....................... 52/511 |
| 4,655,496 A | * | 4/1987 | Gahlau et al. ............. 296/39.3 |
| 5,642,914 A | * | 7/1997 | Takabatake ................. 296/187 |
| 5,806,915 A | * | 9/1998 | Takabatake ................. 296/187 |
| 5,817,408 A | * | 10/1998 | Orimo et al. ................ 428/218 |
| 6,062,624 A | * | 5/2000 | Crabtree et al. ............ 296/39.3 |
| 6,102,465 A | * | 8/2000 | Nemoto et al. ............. 296/39.3 |
| 6,382,635 B1 | * | 5/2002 | Fitzgerald ................... 277/630 |
| 6,412,852 B1 | * | 7/2002 | Lo ............................. 165/80.3 |

FOREIGN PATENT DOCUMENTS

JP          63-188544      *   8/1988

* cited by examiner

*Primary Examiner*—Joseph D. Pape
(74) *Attorney, Agent, or Firm*—Gigette M. Bejin

(57) ABSTRACT

A sound baffle affixed to the sheet metal at the engine compartment of an automobile chassis. The sound baffle is formed of a layer of sound absorbing material affixed to a rigid backing material manufactured from metal, plastic or other rigid material to provide structural support for attachment of the sound baffle to the sheet metal chassis structure. The sound baffle can be affixed to the sheet metal of the engine compartment by non-metallic push pins to provide an assembly that can be easily assembled and will be effective in use.

11 Claims, 5 Drawing Sheets

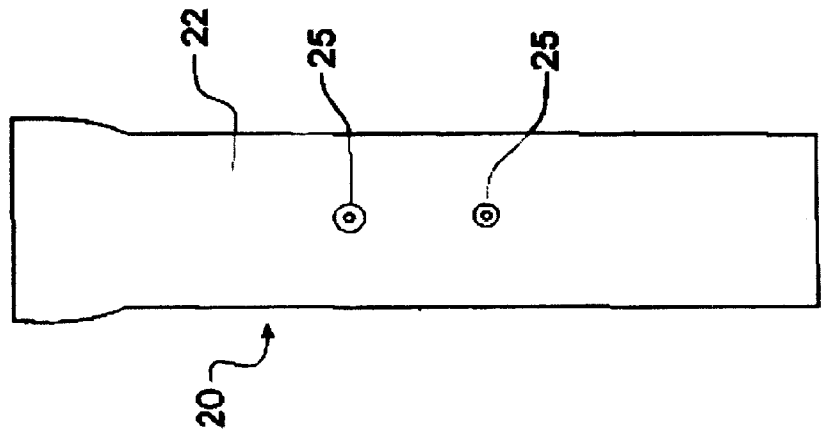
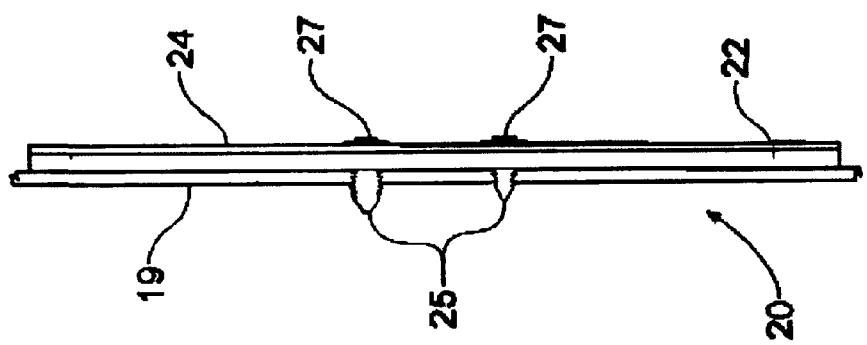
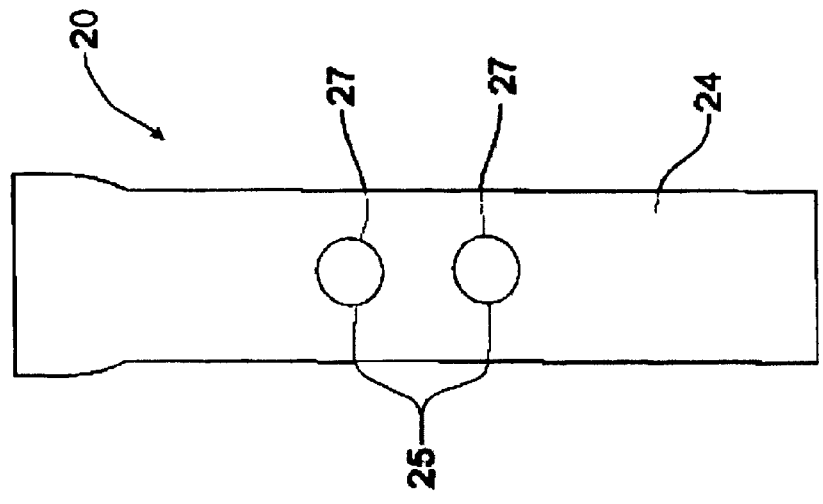

ENGINE COMPARTMENT SOUND BAFFLE

CROSS REFERENCE TO RELATED APPLICATIONS

This application claims domestic priority on U. S. Provisional Patent Application Ser. No. 60/353,353, filed Feb. 4, 2002, the contents of which are incorporated herein by reference.

BACKGROUND OF THE INVENTION

1. Field of the Invention

This invention relates to the reduction of noise and vibration in automobiles, and, more particularly, to a sound baffle installed in the engine compartment of a vehicle.

2. Background of the Invention

Sound baffles have been used in automotive passenger compartment areas in the past to reduce the transmission of sound from the highway and from the automotive transmission into the passenger compartment for the comfort and convenience of the occupants thereof. Typically, such sound baffles are positioned within pillars formed in the automobile chassis to attenuate sound transmission therethrough. An example of such a chassis sound baffle can be found in U.S. Pat. No. 6,382,635, issued on May 7, 2002. The baffle is formed with thermally expandable sealing material that is positioned within a cavity formed by the chassis pillar or rail walls.

It would be desirable to provide a sound attenuating device at the front sheet metal of an automotive chassis to reduce the noise from the engine that would be transmitted into the passenger compartment through the chassis structure.

SUMMARY OF THE INVENTION

It is an object of this invention to provide a sound baffle associated with the front end sheet metal of an automobile chassis.

It is another object of this invention to reduce the engine noise transmitted into the passenger compartment of an automobile.

It is a feature of this invention that the noise level in the passenger compartment of an automobile is reduced by the use of a sound baffle at the front end sheet metal of the chassis.

It is an advantage of this invention that the occupants of the passenger compartment of an automobile are subjected to reduced noise levels from the engine.

It is still another object of this invention to provide a sound baffle structure that can be easily attached to the sheet metal at the front end of an automotive chassis.

It is another feature of this invention that sound absorbing material is positioned between the sheet metal of the automotive chassis and a backer plate.

It is still another feature of this invention that the sound baffle can be attached to the sheet metal structure by non-metallic push pins.

It is another advantage of this invention that the sound baffle can be installed in the desired location easily.

It is still another advantage of this invention that the sound absorbing material operates to dampen the vibrations being transmitted through the sheet metal at the forward, engine compartment of an automobile chassis.

It is yet another object of this invention to provide a sound attenuating apparatus formed from a layer of sound absorbing material affixed to a rigid backing material to provide structural support for attachment to the chassis of an automobile.

It is a further object of this invention to provide a sound baffle for the engine compartment of an automobile chassis that is durable in construction, inexpensive of manufacture, carefree of maintenance, facile in assemblage, and simple and effective in use.

These and other objects, features and advantages are accomplished according to the instant invention by providing a sound baffle affixed to the sheet metal at the engine compartment of an automobile chassis. The sound baffle is formed of a layer of sound absorbing material affixed to a rigid backing material manufactured from metal, plastic or other rigid material to provide structural support for attachment of the sound baffle to the sheet metal chassis structure. The sound baffle can be affixed to the sheet metal of the engine compartment by non-metallic push pins to provide an assembly that can be easily assembled and will be effective in use.

BRIEF DESCRIPTION OF DRAWINGS

The advantages of this invention will become apparent upon consideration of the following detailed disclosure of the invention, especially when taken in conjunction with the accompanying drawings wherein:

FIG. 4 is an elevational view of the forward face of the sound baffle depicted in FIG. 3, showing the sound absorbing material to be engaged with the sheet metal surface of the automobile chassis;

FIG. 5 is an end view of the sound baffle depicted in FIG. 4, the non-metallic push pins being depicted as engaged with chassis sheet metal;

FIG. 6 is an elevational view of the rearward face of the sound baffle depicted in FIG. 4 showing the rigid backing with the push pins extending therethrough;

DETAILED DESCRIPTION

Figure 1:
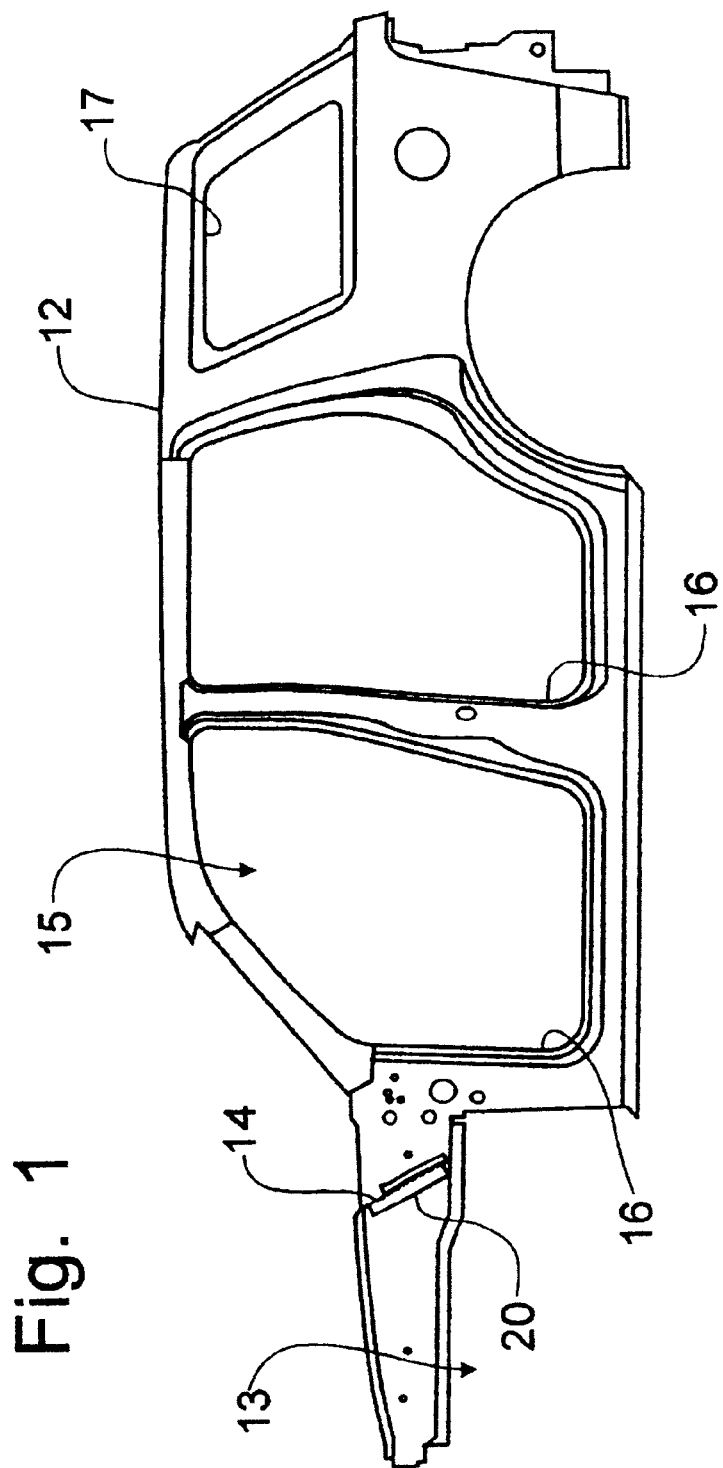
FIG. 1 is an elevational view of an automobile chassis including the front end sheet metal housing the engine compartment, the sound baffle being depicted at a structural member within the front end sheet metal portion of the chassis.
Figure 2:
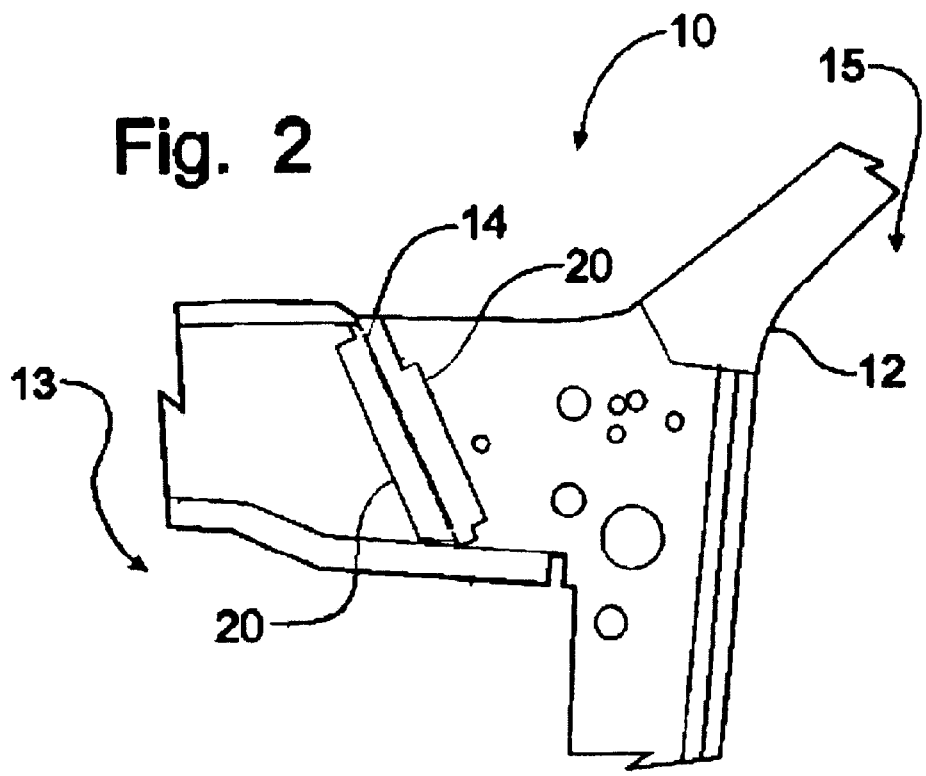
FIG. 2 is an enlarged elevational view of a portion of the automobile chassis depicted in FIG. 1 to depict the deployment of the sound baffle at the front end sheet metal.
Figure 3:
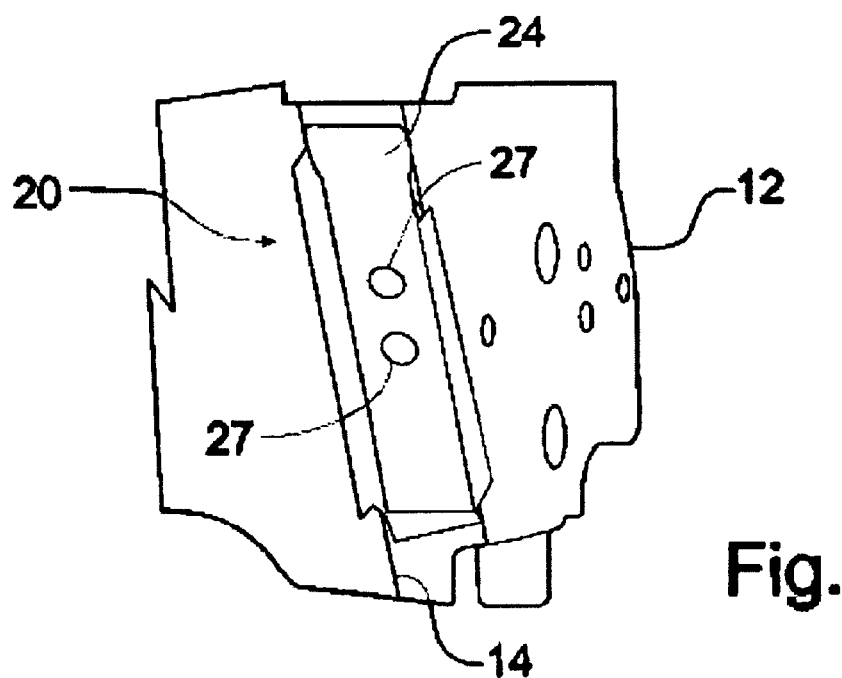
FIG. 3 is yet a further enlarged portion of the automobile chassis shown in FIG. 2, but taken at an angle relative to the view of FIG. 2 to depict a sound baffle in elevation in the deployment thereof at the front end sheet metal of the chassis.

Referring to FIGS. 1 and 3, an automobile chassis 12 for a representative vehicle 10 having a sound baffle affixed thereto according to the principles of the instant invention can best be seen. The engine compartment 13 will typically be at the forward end of the chassis 10 with the passenger compartment 15 being located behind a firewall (not shown) separating the engine compartment 13 from the passenger compartment 15. As one of ordinary skill in the art will readily recognize, the passenger compartment 15 will be provided with doorways 16 for the ingress and egress of the occupants, as well as windows 17 for visibility.

The engine (not shown) is mounted within in the engine compartment 13 to provide operative power for the vehicle 10 in a conventional manner. The reciprocating engine, whether gasoline or diesel, creates noise and vibration while operating to produce rotational and electrical power for operating of the vehicle 10. This noise and associated vibrations can be transmitted to the occupants of the passenger compartment 15 through the chassis 12, causing a certain level of discomfort.

The chassis 12 is typically manufactured from formed and welded sheet metal, including the forward engine compartment 13. One skilled in the art will recognize that other engine compartment locations are certainly possible, including mid-mounted engines and rear-mounted engines; therefore, the actual location of the engine compartment 13 relative to the passenger compartment 15 is not significantly relevant. As depicted in FIGS. 1 and 3, the engine compartment 13 is located forwardly of the passenger compartment 15 and is formed from sheet metal including at least one box-section 14 that provides structural support for the chassis and facilitates the welding of the front end sheet metal defining the engine compartment 13.

The sound baffle 20 is positioned within the box-section 14 between the front end sheet metal defining the engine compartment 13 and the remainder of the chassis 12. The sound baffle 20 is a thin, linearly extending member that is sized to fit within the box-section 14 to fit on one side thereof. As is best seen in FIGS. 4 and 6, the sound baffle 20 is formed of a layer of sound absorbing material 22, such as 400% heat expanding mastic (EVA Rubber) manufactured by Orbseal, and a layer comprising a rigid backing 24 that can be formed of any suitable rigid material such as sheet metal, plastic, and other known materials, that will provide a structural support for the sound absorbing material 22 and permit attachment to the chassis 12.

The sound baffle 20 can be affixed to the sheet metal in a number of ways, including by adhesive; however, the preferred manner of attachment is depicted in FIGS. 4 and 6 as non-metallic push pins 25 which provide an economical attachment mechanism to press the sound absorbing material 22 against the sheet metal 19 of the box section 14. The non-metallic push pins 25 are preferably formed from plastic and do not transmit sound and vibrations through the sound absorbing material layer 22 to the rigid backing 24 to permit a resonating thereof. Each push pin 25 is formed with a head 27 that engages the rigid backing material to prevent the push pins 25 from passing through the sound baffle 20, thus connecting the layer of rigid backing material 24 to the chassis 12 with the layer of sound absorbing material 22 positioned therebetween.

In utilization, the sound baffle 20 will preferably be affixed to the interior of the box-section 14 to each of the interior walls 19 thereof, thus dampening the transmission of sound and vibrations through the box-section to the passenger compartment 15. One skilled in the art will recognize that deployment of the sound baffles 20 is not limited to the interior of the box-sections of the chassis 12, but can be affixed to open faces of sheet metal as well to dampen the transmission of sound and vibrations along the sheet metal structure.

Figure 7:
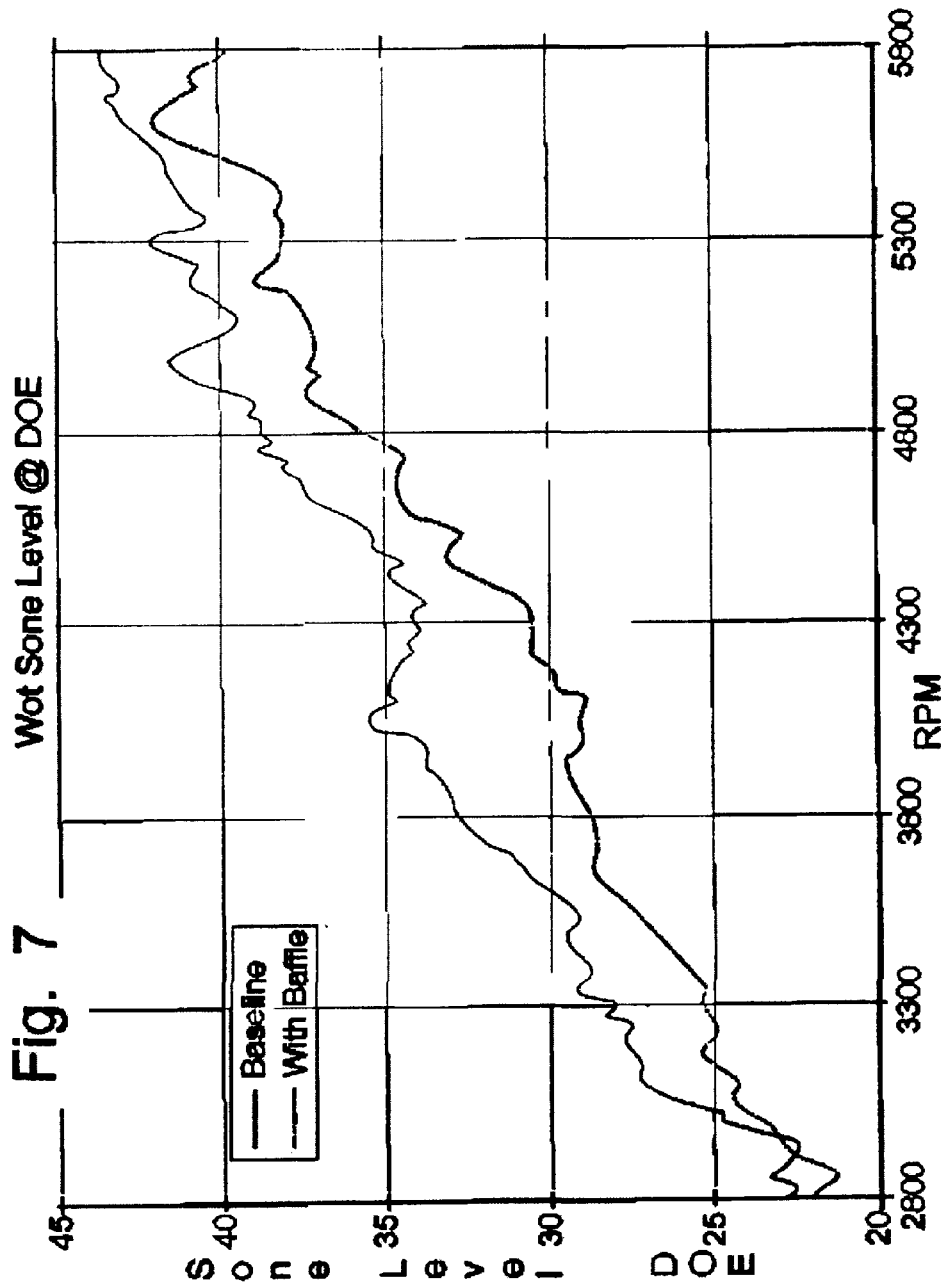
FIG. 7 is a graph depicting analytical test results, plotting Sone Level (DOE) against Engine RPM and showing the drop in Sone Level for interior sound noise with the installation of the sound baffle incorporating the principles of the instant invention.
Figure 8:
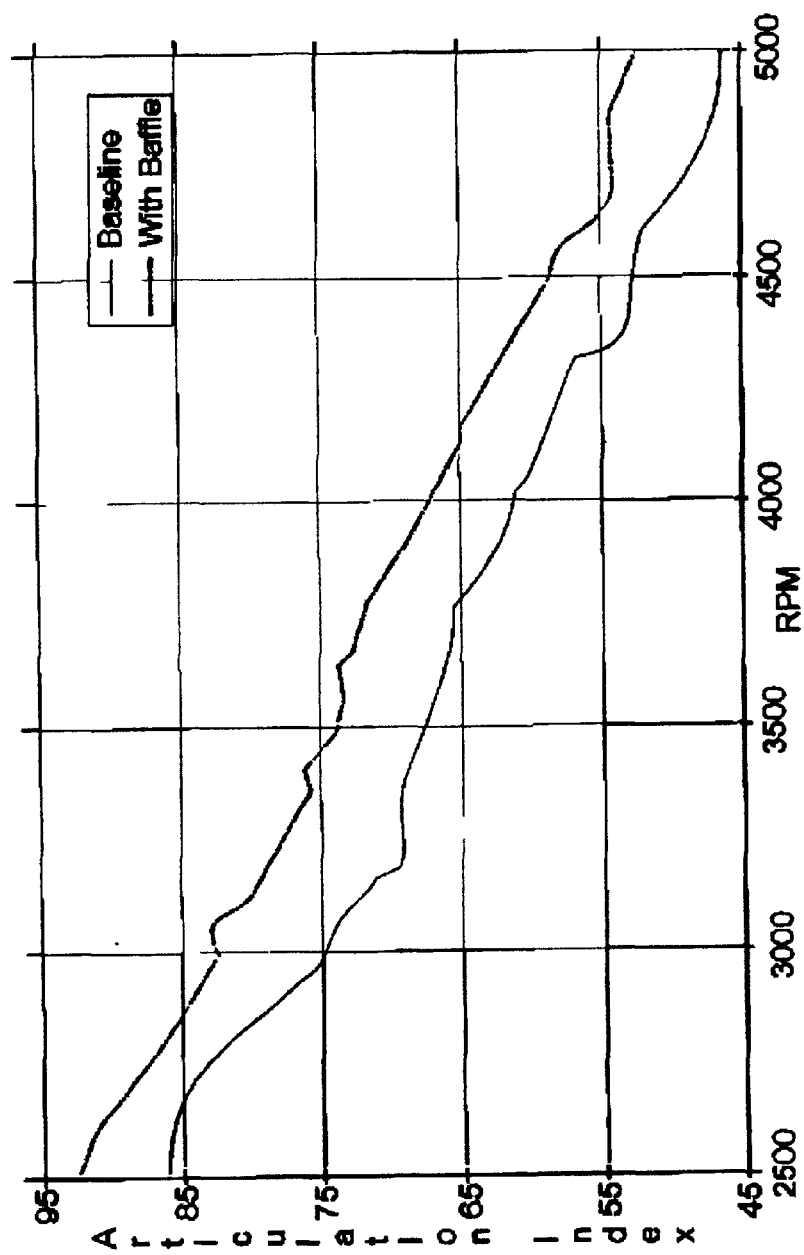
FIG. 8 is a graph depicting analytical test results, plotting Articulation Index against Engine RPM and showing the increase in the Articulation Index with the installation of the sound baffle.

Referring now to FIGS. 7 and 8, graphs depicting analytical tests show that the utilization of sound baffles 20, as described above within the box-section 14 between the front end sheet metal defining the engine compartment 13 and the passenger compartment 15, resulted in a reduction of noise in the passenger compartment 15 at an average of 1.8 sone for interior sound, which is an average of 7% improvement in articulation index leading to an anticipated improvement of 5% in customer satisfaction for passenger compartment sound levels. The sound baffle 20 also results in a reduction of heat transmitted through the sheet metal from the engine to the passenger compartment 15.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. In an automobile chassis defining an engine compartment and an adjacent passenger compartment, said chassis being formed of metal, the improvement comprising:

at least one sound baffle affixed to said chassis between said engine compartment and said passenger compartment to dampen noise and vibrations generated in the engine compartment to reduce the transmission thereof into said passenger compartment, said at least one sound baffle being affixed internally in a box-section formed in said chassis between said engine compartment and said passenger compartment with said sound baffle being affixed to an interior surface of said box-section by a fastening apparatus that passes through said sound baffle to engage said interior surface of said box-section.

2. The automobile chassis of claim 1 wherein said box-section has mounted on each interior surface thereof one of said sound baffles.

3. The automobile chassis of claim 1 wherein said sound baffle is formed of a layer of sound absorbing material affixed to a layer of rigid backing material.

4. The automobile chassis of claim 3 wherein said sound baffle is mounted to said chassis with said layer of sound absorbing material being located between said chassis and said rigid backing material layer.

5. The automobile chassis of claim 4 wherein said fastening apparatus includes at least a pair of non-metallic push pins extending through said sound absorbing layer to interconnect said rigid backing layer and said chassis.

6. A sound baffle for deployment in an automobile chassis between an engine compartment defined by said chassis and a passenger compartment defined by said chassis adjacent said engine compartment, comprising:

a layer of rigid backing material to provide structural support for said sound baffle;

a layer of sound absorbing material positionable between said chassis and said layer of rigid backing material to dampen noise and vibrations transmitted through said chassis; and fastening apparatus for connecting said layer of sound absorbing material to said chassis, said fastening apparatus passing through said rigid backing material and said sound absorbing material to engage said chassis.

7. The sound baffle of claim 6 wherein said fastening apparatus comprises a pair of non-metallic push pins having a head that engage said layer of rigid backing material.

8. The sound baffle of claim 7 wherein said layer of sound absorbing material is positioned within a box-section formed between said engine compartment and said passenger compartment.

9. A method of reducing sound and vibrations in a passenger compartment of a vehicle having a chassis defining an engine compartment adjacent to said passenger compartment, comprising the steps of:

deploying at least one sound baffle into a box-section of said chassis between said engine compartment and said passenger compartment, said at least one sound baffle being mounted on an interior surface of said box-section with a pre-expanded layer of sound absorbing material being positioned between a rigid backing member and said interior surface of said box-section.

10. The method of claim 9 said mounting step includes the step of:

affixing one of said sound baffles to each interior surface of said box-section.

11. The method of claim 9 wherein said deploying step further includes the step of:

affixing said sound baffle to said chassis by a pair of non-metallic push pins extending through said layer of said rigid backing material and said layer of sound absorbing material to engage said chassis, said push pins having a head that engages said layer of rigid backing material to prevent said push pins from passing through said sound baffle.

* * * * *